March 12, 1929.   J. T. CHUDOMELKA   1,704,724
ANIMAL OILER
Filed April 2, 1928
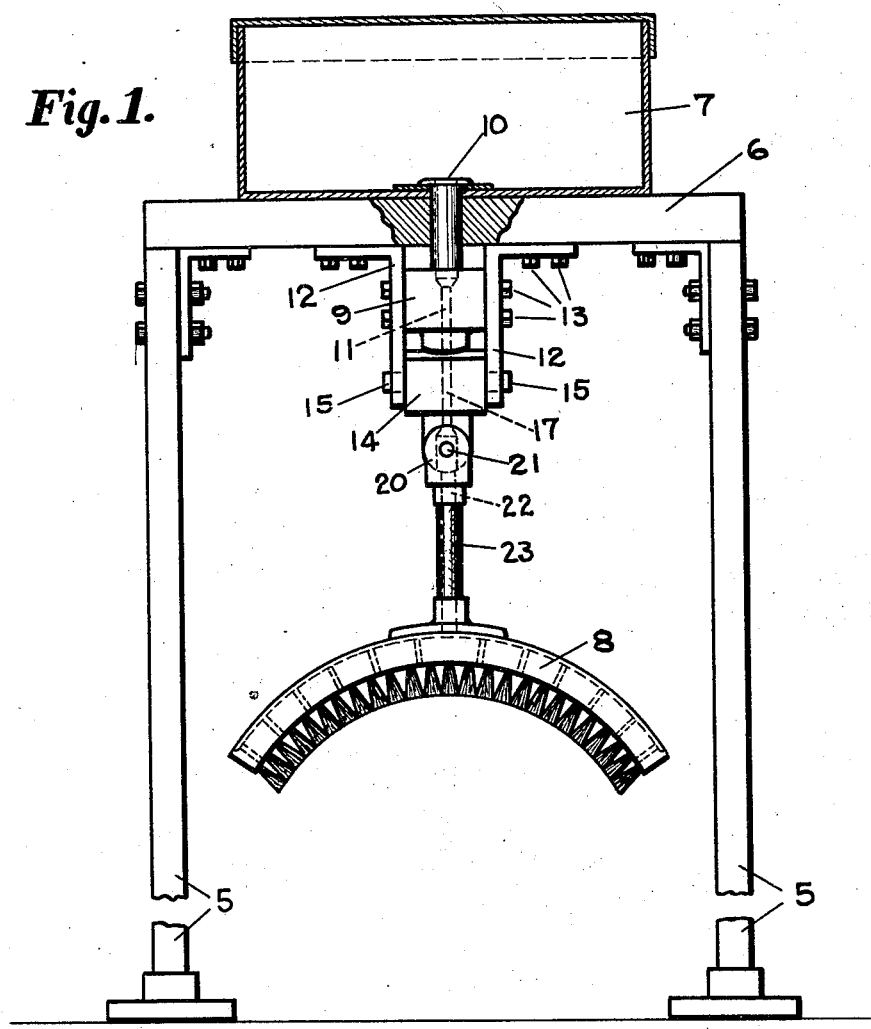
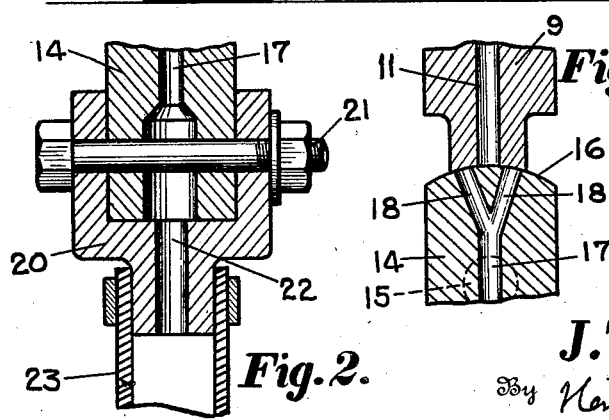
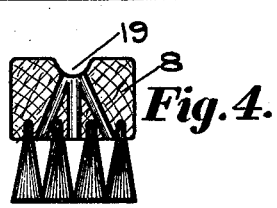
Inventor
J. T. Chudomelka
Attorney Patented Mar. 12, 1929.

1,704,724

UNITED STATES PATENT OFFICE.

JOHN T. CHUDOMELKA, OF DODGE, NEBRASKA.

ANIMAL OILER.

Application filed April 2, 1928. Serial No. 266,581.

This invention relates to a liquid dispenser or oiler for live stock and has for its object, broadly, to provide an apparatus which will operate by contact with the body of the animal to dispense medicated liquid or oil effectively and without waste.

One of the objects is to provide a device which will operate by swinging movements of a brush, said movements being limited to "back and forth" movements in a single circle's arc and will not dispense liquid when swung transversely thereto, and will not require vertical movements for operation.

Another object is to provide an oil or liquid dispenser which will consist of few and simple parts so that it may be manufactured at a limited expense, and will be durable in use.

The invention includes such a construction that it may be used upon swine or small animals as well as upon cattle.

With the above objects in view and others to be mentioned the invention presents a new and useful construction, combination and arrangement of parts as described herein and claimed, and as illustrated in the accompanying drawing, it being understood that changes may be made in form, size, proportion and minor details, said changes being determined by the scope of the invention as claimed.

In the drawing, Fig. 1 is a front or rear view showing one embodiment of the invention, the frame being broken away and partly in section, a tank also being shown in section. Fig. 2 is an enlarged detail showing part of a hinge-joint taken at right-angles to the hinge-joint shown in Fig. 1. Fig. 3 is an enlarged detail in section showing a part of a valve and the two-way conduit therein, the view being taken at right-angles to the valve and block shown in Fig. 1. Fig. 4 is a transverse section taken through the brush.

Referring now to the drawing for a more particular description, numeral 5 indicates an upright frame including a cross-piece 6 for supporting parts to be described, and while I have shown the frame to consist of two upright supports 5, this feature is not important since the operating parts to be described may be suspended from any horizontal support.

Numeral 7 indicates a tank for containing oil or liquid to be dispensed from the elongated arcuate brush 8 while the brush engages the back of the animal.

Numeral 9 indicates a stationary valve-block having a tubular part 10 in communication with the tank and provided with a passageway 11 opening on its lower concaved end as shown in Fig. 3 and in communication with its tubular part 10.

Mounted on the valve-block 9 at opposed sides thereof are brackets 12, said brackets being firmly secured to the valve-block and to the cross-piece 6 by any suitable means, as by use of bolts 13.

Numeral 14 indicates a valve provided at its opposed sides with trunnions 15 for a pivotal mounting of the valve in said brackets, the valve has a convexed surface 16 and a passageway 17 provided with upwardly divergent branches 18 as best shown in Fig. 3 of the drawing.

The curved surfaces of the valve and valve-block are in engagement to prevent any flow of liquid or oil from the tank except after the valve has been swung in a limited arc to permit the passageway 11 to communicate with one of the branches 18, but when this communication is established the liquid may flow through the valve to the brush 8. The liquid or oil will flow in the groove 19 of the brush.

As thus described any transverse swinging movement of the valve will be prevented. However the mounting for the brush is such that it may be swung transversely of the frame 5 without injury to any of the parts mentioned, and this is a feature of advantage since cattle or swine may move at the sides of the brush as well as beneath it.

Numeral 20 indicates a hinge-coupling for the lower end of the valve 14 and by means of a bolt 21 it has a pivotal mounting thereon. The coupling 20 is provided with a passageway 22 in constant communication with the passageway 17 of the valve. Numeral 23 indicates a flexible conducting-pipe communicating with the passageway 22 of the coupling 20 and in communication with the grooves 19 of the brush, and as thus described oil or liquid may flow from the tank to the brush after the brush has been swung at right-angles to its longitudinal axis, but no flow of oil or liquid will occur by any endwise swinging movements of the brush.

While I have stated that the pipe 23 is flexible this is not necessary to operation and is not an important feature. This pipe 23 should be sufficiently rigid to cause the liquid to flow through the valve when the animal swings the brush at right-angles to its longitudinal axis.

Since the tube 23 is elastic and may be bent by an animal beneath the brush, said brush will operate to curry the animal as well as to dispense the oil or liquid, and this is an obvious advantage.

In operation, the tank may be filed with oil or medicated liquid and the valve will normally prevent any flow. If the device is mounted in a pen where cattle or swine may freely move about the brush, in such instances, it may be swung endwise by animals pushing or crowding against it but, on account of the construction as described, this endwise swinging movement of the brush will not cause any flow or waste of oil, but, in operation an animal beneath the brush may move it forwardly or rearwardly to cause a flow of the oil or liquid through the valve to be dispensed to the back of the animal.

It will be seen that the operating parts are few and simple. They may be manufactured at a very limited expense and will be durable, and the parts may be conveniently assembled. Since the valve 14 and valve-block 9 are of equal width these parts may be adequately supported by the brackets 12 so that all stresses directed to these parts will be adequately resisted.

I claim as my invention:

1. In an oiler and liquid dispenser for animals, a horizontal support, a tank on the support, a pair of opposed brackets below and secured to the support, a valve-block between the brackets having a passageway communicating with the tank, a valve mounted to permit swinging movements in a single arc between the brackets and having a passageway with a pair of branches, a brush below the valve, connecting elements between the valve and brush providing passageways from the passageway of the valve to said brush, said brush being movable in one arc for disposing said branches, in alternation, in register with the passageway of the valve-block, and being movable in an arc at right-angles to the first named arc, said branches remaining in non-register with the passageway of said valve-block.

2. In an oil and liquid dispenser for animals, a support, a tank on the support, a valve-block having a passageway, means for securing said block to the support with its passageway in communication with the tank, a valve having a passageway and a pair of branches leading from said passageway, means for mounting the valve pivotally with its surface normally obstructing the passageway of the valve-block, a brush provided with a groove, a hinge-coupling pivotally mounted upon the valve and having a passageway in constant communication with said valve, and a flexible conducting-pipe in communication with the passageway of the hinge-coupling for a communication with the groove of said brush.

3. In an oil and liquid dispenser, a support, a pair of brackets secured to the support, a tank upon the support, a valve-block having a passageway communicating with the tank and disposed between said brackets, a valve between and having a mounting upon the brackets to permit it to swing in a single arc, said valve having a passageway and branches leading from said passageway, a hinge-coupling having a passageway in constant communication with the passageway of the valve and having a pivotal mounting to permit it to swing in an arc at right-angles to the arc of movement of said valve, a brush provided with a conduit and disposed below said hinge-coupling, and a conducting-pipe in constant communication with the passageway of the hinge-coupling for a communication with the conduit of said brush.

4. In an oil and liquid dispenser for animals, a support, a tank on the support, a valve-block having a passageway in constant communication with the tank, a valve having a passageway and a pair of branches leading from said passageway, said valve having a mounting to permit it to swing in a single arc, a hinge-coupling mounted to permit swinging movements in an arc at right-angles to the arc of movement of said valve and having a passageway in constant communication with said valve, and a conducting-pipe between said conduit and the passageway of the hinge-coupling.

In testimony whereof, I have affixed my signature.

JOHN T. CHUDOMELKA.